United States Patent [19]

Vichon et al.

[11] Patent Number: 4,798,449

[45] Date of Patent: Jan. 17, 1989

[54] POLYCHROMATIC ACOUSTO-OPTICAL DEFLECTOR

[75] Inventors: Didier Vichon, Orsay; Dominique Bardon, Paris; Christian Encrenaz, Gif-sur-Yvette, all of France

[73] Assignee: Societe Francaise d'Equipments pour la Navigation Aerienne & Societe Automates et Automatismes, France

[21] Appl. No.: 40,905

[22] Filed: Apr. 21, 1987

[30] Foreign Application Priority Data

Apr. 25, 1986 [FR] France .............................. 86 06001

[51] Int. Cl.⁴ .......................... G02F 1/11; G02F 1/33; G02B 27/14
[52] U.S. Cl. ..................................... 350/358; 350/174
[58] Field of Search ............... 350/358, 174, 169, 601, 350/602, 603

[56] References Cited

U.S. PATENT DOCUMENTS

| 2,909,097 | 10/1959 | Alden et al. | 350/169 X |
| 3,624,272 | 11/1971 | Favreau | 350/169 |
| 4,141,625 | 2/1979 | Pickar et al. | 350/171 |
| 4,371,964 | 2/1983 | Podmaniczky et al. | 372/38 |

FOREIGN PATENT DOCUMENTS

| 0075700 | 4/1983 | European Pat. Off. . | |
| 8503141 | 7/1985 | PCT Int'l Appl. | 350/358 |

Primary Examiner—Eugene R. LaRoche
Assistant Examiner—Nathan W. McCutcheon
Attorney, Agent, or Firm—Gerald J. Ferguson, Jr.

[57] ABSTRACT

An incident beam (5) composed by a plurality of rays passes through a crystal (1') in which the rays of given wavelengths ($\lambda 1, \lambda 2, \lambda 3$) are modulated and deflected to be recieved by respective mirrors including a most distant mirror which is furthest from the crystal (1') and is a conventional optical mirror reflecting along an optical axis (42), while the intermediate mirrors (40, 41) are holographic mirrors which reflect the other rays ($\lambda 2, \lambda 1$) collinearly along the same optical axis (42).

3 Claims, 1 Drawing Sheet

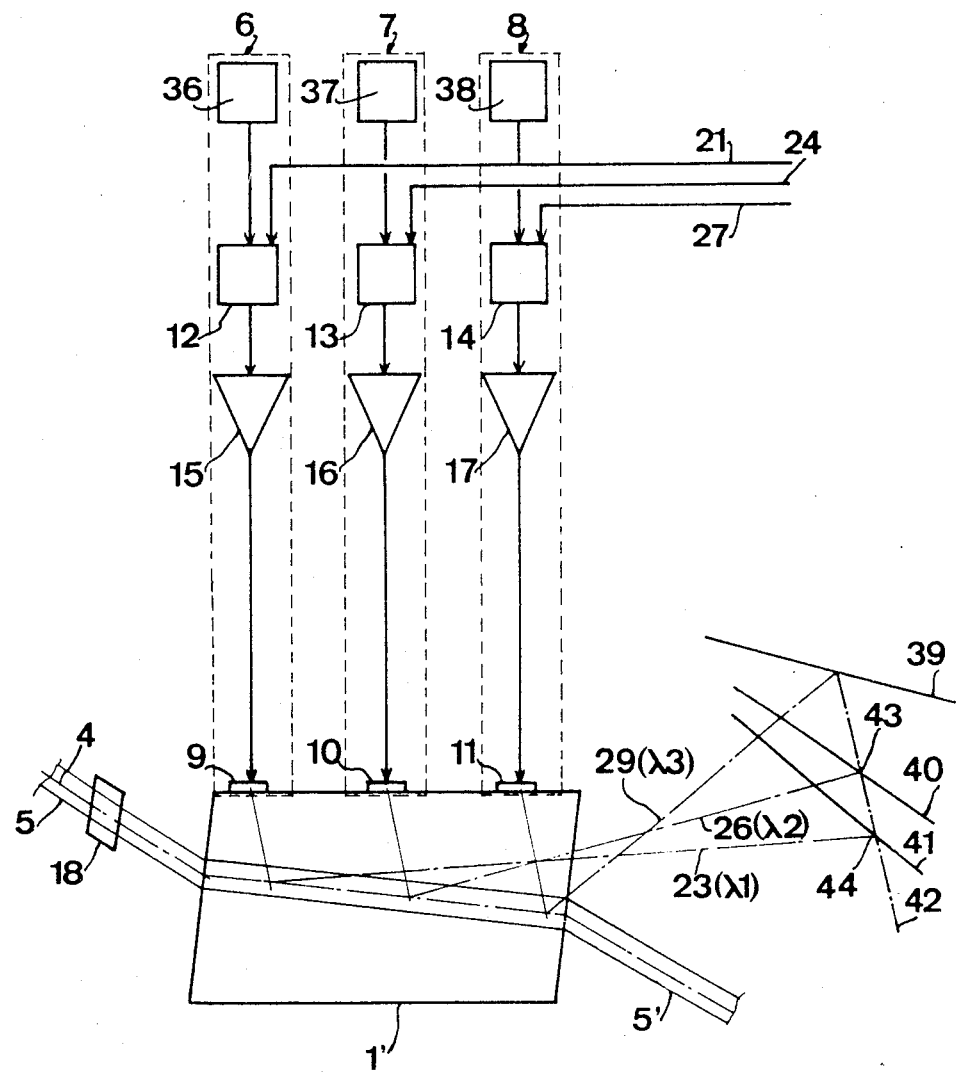

POLYCHROMATIC ACOUSTO-OPTICAL DEFLECTOR

The invention relates to an improvement to the polychromatic acousto-optical deflector described in French patent Nos. 2 557 985 and 2 575 940 which are incorporated herein by reference. More precisely, this improvement is usable with each of the two embodiments described in said documents.

BACKGROUND OF THE INVENTION

Patent No. 2 557 985 relates to a deflector comprising a plurality of distinct crystals of paratellurite through which there passes a single polarized beam comprising a plurality of rays at different wavelengths. Ultrasound is applied to each of these crystals which then modulate respective ones of said rays as desired. When there are three such rays and three such crystals, the rays advantageously have wavelengths corresponding to the colors red, green, and blue so as to be able to form color images when the three modulated rays are combined. The modulated rays leave the crystal in succession along three respective directions which are not only very close to one another but which are also substantially parallel.

Patent No. 2 575 840 relates to a first improvement in which the three crystals are replaced by a single crystal having a special cut and which has ultrasonic signals applied thereto at points which are spaced apart. As a result, a suitably polarized incident beam emits a respective modulated emerging ray in relation to each of the spaced-apart points. The three emerging rays are likewise very close to one another and substantially parallel.

When going into greater detail, it is observed that the rays cannot be exactly parallel since their deflection in each crystal, or in the sole crystal, depends both on the wavelength $\lambda$ of the incident beam and on the acoustic frequency F injected into the crystal. For each of these rays, the deflection is proportional to $\lambda F$. Consequently, although they appear to be substantially parallel, the various emerging rays diverge. There is an angle of about ten minutes of arc between the blue ray and the green ray, and the divergence between the red ray and the blue ray is thirty minutes of arc.

In order to provide a proper color image by superposing three prime color rays, it is necessary for the modulated rays to be strictly collinear.

The main aim of the present invention is therefore to improve the polychromatic acousto-optical deflector of the above-mentioned patents so that the modulated emerging rays are caused to be collinear when they leave the deflector.

SUMMARY OF THE INVENTION

The present invention provides an acousto-optical deflector for separating at least two deflected emerging rays from a beam composed of a plurality of rays at different wavelengths, and for directing said deflected rays collinearly, the deflector comprising: at least one optical crystal through which said beam passes, said beam having a main optical axis and the emerging rays of different wavelengths having respective secondary optical axes; and a reflecting mirror placed on each of the secondary optical axes, said mirrors being situated one behind another going away from the crystal to constitute intermediate mirror(s) and a most distant mirror which is furthest away from the crystal, said most distant mirror reflecting a corresponding one of said emerging rays along an axis intersecting the other emerging ray(s), and each intermediate mirror being a holographic mirror having a reflection waveband centered on the wavelength of a corresponding one of said other emerging ray(s) deflected by the crystal, and being disposed and oriented to reflect said corresponding emerging ray collinearly with the ray reflected by said most distant mirror.

In other words, each holographic mirror is disposed so that the reflection point on said mirror of the ray whose wavelength corresponds thereto is substantially the same as the point where the rays reflected by the other mirrors situated behind said mirror pass therethrough, and the angle of said holographic mirror is such that the ray which it reflects is substantially collinear with the rays which pass therethrough.

BRIEF DESCRIPTION OF THE DRAWING

An embodiment of the invention is described by way of example with reference to the sole FIGURE of the accompanying drawing which is a simplified diagram showing a polychromatic aousto-optical deflector in accordance with the invention and intended to modulate three rays which correspond to the red, blue, and green primary colors and to transmit them collinearly.

MORE DETAILED DESCRIPTION

The deflector shown is the same as the deflector of patent No. 2 557 985 together with the improvement of patent No. 2 575 840.

A single crystal 1' of paratellurite with an off-axis cut has a beam 5 of optical axis 4 passing therethrough. Upstream from the crystal 1 there is a Brewster's angle polarizing plate 18. Three piezo-electric transducers 9, 10, and 11 are mounted on one face of the crystal 1' at successive points which are spaced apart along the optical axis 4 in order to receive ultrasonic frequencies which increase in value along the direction of propagation of the processed beam 5.

Each of the transducers 9, 10, and 11 is connected to a respective ultrasonic source 6, 7, or 8 comprising a radio frequency signal emitter 36, 37, or 38 connected to the transducer via a modulator 12, 13, or 14 and an amplifier 15, 16, or 17. Each modulator is connected via a corresponding line 21, 24, or 27 to a control member (not shown) which causes the corresponding modulator 12, 13, or 14 to become conductive when required, and which consequently initiates operation of the transducer 9, 10, or 11.

In the present example, the incident beam 5 is constituted by three distinct rays, emitted by lasers for example, at wavelengths $\lambda 1$, $\lambda 2$, and $\lambda 3$ which correspond to the primary colors red, blue, and green. The transducers 9, 10, and 11, when activated, transmit ultrasonic waves into the crystal 1' at successively higher frequencies going from the first transducer 9 to the last transducer 11 along the direction of propagation of the processed beam 5.

In the absence of any emission from the transducers 9, 10, and 11, the beam 5 is refracted to become 5'. Each of the transducers 9, 10, and 11 acts on a respective one of the rays in the beam 5, and at the same time as it modulates said ray it changes its polarization so that starting from the points along the optical axis 4 where the beam 5 encounters the ultrasound emission axes from the transducers 9, 10, and 11, three distinct modulated emerging rays are obtained having respective wavelengths λ1, λ2, and λ3 (which rays are represented solely by their optical axes 23, 26, and 29 in order to improve the clarity of the drawing), and these axes are referred to herein as secondary optical axes in order to distinguish them from the main optical axis 4 of the incident beam 5 and of the refracted beam 5'.

These emerging rays on secondary optical axes 23, 26, and 29 appear to be parallel, but in fact they differ slightly because they have different points of origin, and mainly because they are deflected by an amount proportional to λF as explained above.

A deflector in accordance with the invention comprises as many reflecting mirrors 39, 40, 41 as there are secondary optical axes 23, 26, and 29, which mirrors are placed on respective ones of said axes in succession going away from the crystal 1' in such a manner as to provide a most distant mirror 39 which is furthest from the crystal 1' together with intermediate mirrors 40 and 41 which are situated between the crystal 1' and the most distant mirror 39.

The most distant mirror 39 is a conventional optical mirror which receives the modulated rays λ3 on secondary optical axis 29 and which reflects it along an optical axis 42.

The intermediate mirrors 40 and 41 are holographic mirrors made to reflect only at one particular wavelength and to transmit at other wavelengths.

Holographic mirrors and methods of manufacture are well known and need not be described. In practice, each holographic mirror has a narrow reflection band having a bandwidth of about 10 nm, and this is centered, during manufacture, on the wavelength to be reflected.

The modulated ray λ3 reflected by the most distant and conventional optical mirror 39 passes through the holographic mirror 40 at a point 43 and through the holographic mirror 41 at a point 44. The mirror 40 is disposed to receive the ray λ2 on secondary optical axis 26 at the point 43 and it is inclined so as to reflect said ray λ2 along the optical axis 42 of the ray λ3 reflected by the conventional mirror 39. The holographic mirror 41 is disposed to receive the ray λ1 on secondary optical axis 23 at the point 44 and it is inclined to reflect said ray λ1, along the same optical axis 42.

In this manner, each of the three modulated rays of wavelength λ1, λ2, and λ3 is reflected by a corresponding mirror 41, 40, 39 collinearly along the optical axis 42 and passes through any holographic mirrors that do not reflect it.

It may be observed that the most distant mirror 39 furthest from the crystal 1' could also be a holographic mirror adapted to reflect the emerging ray of wavelength λ3, but that this would not provide any particular advantage. It is simpler and cheaper to use a conventional optical mirror.

Naturally, the mirrors 39, 40, and 41 are mounted on supports (not shown) fitted with means for adjusting their positions.

We claim:

1. An acousto-optical deflector for separating at least two deflected emerging rays from a beam composed of a plurality of rays at different wavelengths, and for directing said deflected rays collinearly, the deflector comprising: at least one optical crystal through which said beam passes, said beam having a main optical axis and the emerging rays of different wavelengths having respective secondary optical axes; and a reflecting mirror placed on each of the secondary optical axes, said mirrors being situated one behind another going away from the crystal to constitute at least one intermediate mirror and a most distant mirror which is furthest away from the crystal, said most distant mirror reflecting a corresponding one of said emerging rays along an axis intersecting the other emerging rays or rays, and each intermediate mirror being a holographic mirror having a reflection waveband centered on the wavelength of a corresponding one of said other emerging ray or rays deflected by the crystal, and being disposed and oriented to reflect said corresponding emerging ray collinearly with the ray reflected by said most distant mirror.

2. A deflector according to claim 1, wherein said most distant mirror is a conventional optical mirror.

3. A deflector according to claim 1, including at least one crystal capable of producing three distinct emerging rays having wavelengths corresponding to three primary colors such as red, green, and blue, said most distant mirror being disposed to reflect the ray having the shortest wavelength and two intermediate holographic mirrors being disposed to reflect respective ones of the other two rays of longer wavelengths collinearly therewith.

* * * * *